Sept. 3, 1968     P. J. HEMRICK ET AL     3,400,036

ARTICLE HAVING IRIDESCENT SURFACE AND METHOD OF MAKING SAME

Filed March 16, 1964     3 Sheets-Sheet 1

INVENTORS
Philip J. Hemrick
Richard P. Gremling
Hugh R. Mason
Merle F. Schreurs

BY McCoy, Greene, Medert
    + de Grotenhuis
ATTORNEYS

Sept. 3, 1968   P. J. HEMRICK ET AL   3,400,036
ARTICLE HAVING IRIDESCENT SURFACE AND METHOD OF MAKING SAME
Filed March 16, 1964   3 Sheets-Sheet 2

INVENTORS
Philip J. Hemrick
Richard P. Gremling
Hugh R. Mason
Merle F. Schreurs
BY McCoy, Greene, Medert
& TeGrotenhuis
ATTORNEYS

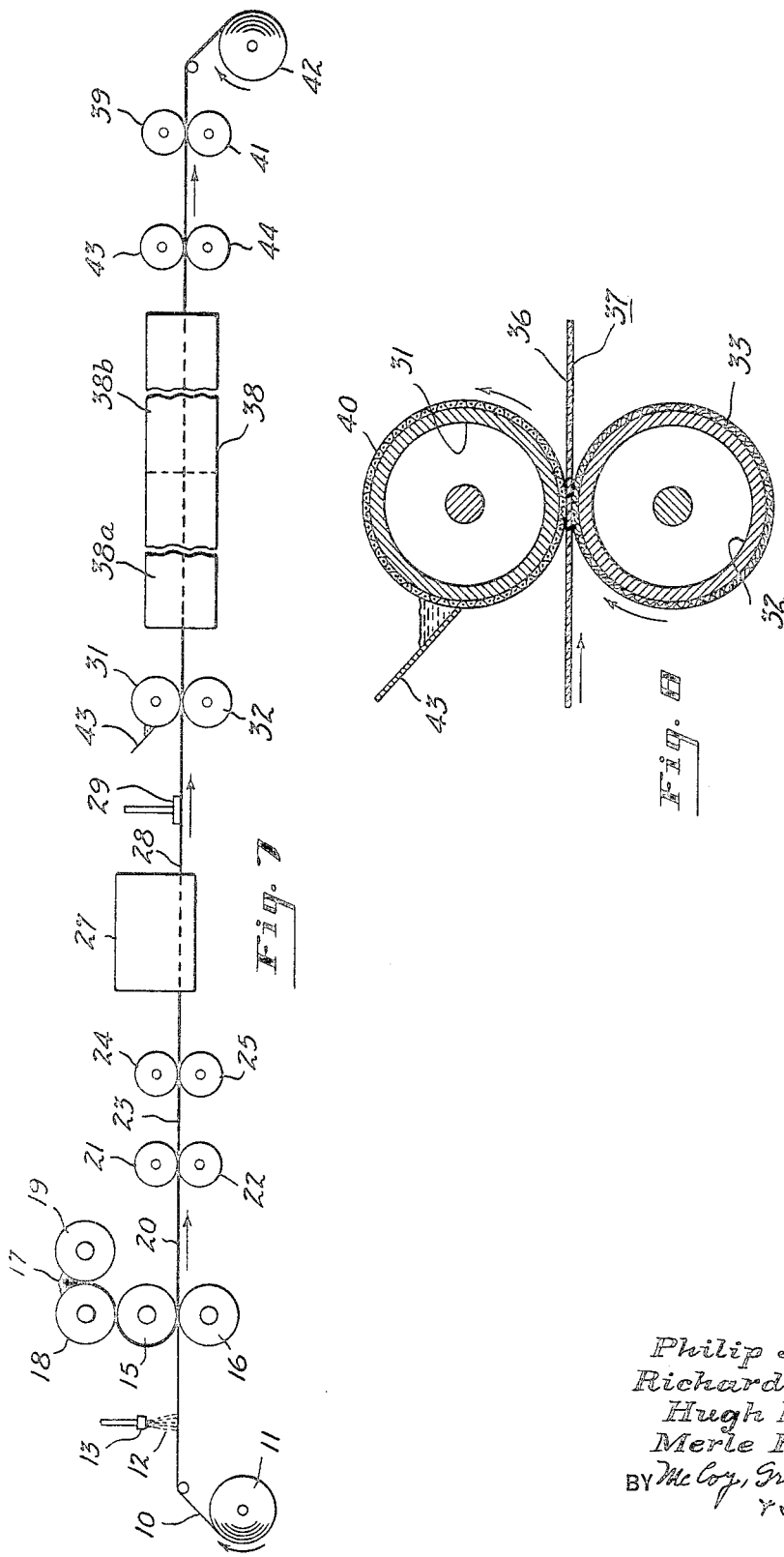

United States Patent Office 3,400,036
Patented Sept. 3, 1968

3,400,036
ARTICLE HAVING IRIDESCENT SURFACE AND
METHOD OF MAKING SAME
Philip J. Hemrick, Toledo, Richard P. Gremling, Sylvania, and Hugh R. Mason and Merle F. Schreurs, Toledo, Ohio, assignors to The General Tire & Rubber Company, Akron, Ohio, a corporation of Ohio
Filed Mar. 16, 1964, Ser. No. 351,916
14 Claims. (Cl. 161—2)

ABSTRACT OF THE DISCLOSURE

An article is disclosed and a method for making the same, including rubbing a small amount of fine pigment upon the surface of a polished plastic base and applying a transparent film of varying thickness to form a laminate having an iridescent finish of durable construction.

---

This invention relates to articles having an iridescent surface and particularly to flexible fabrics suitable for making purses, shoes and clothing and the like which fabrics have a highly attractive wear resistant surface of controllable design and to a method of making such articles.

It is well known that some of the most beautiful effects of light interference result from the multiple differential reflection of light between two surfaces—one of which is a thin film of transparent material. Several examples of so-called "thin film" effects are thin films of oil on water, soap bubbles and cracks in a piece of glass. Attempts made to duplicate such effects on fabrics, however, have been to no avail.

It is an object of this invention to provide a laminated article having an enhanced iridescent appearance, which article has layers resistant to separation and has good wear resistance.

Another object is to provide a process for producing such a laminated article.

Other objects will be apparent from the following description of the invention as illustrated in the drawings in which:

FIGURE 1 is a perspective view of a fragment of the finished article showing one possible embossing pattern;

FIGURE 2 is a sectional view on the line 2—2 of FIGURE 1;

FIGURE 3 is a schematic view of the process for manufacturing the article;

FIGURE 4 is an enlarged view of the rollers 31 and 32 of FIGURE 3;

FIGURE 5 is an enlarged section of FIGURE 1 showing in detail the iridescent effect;

FIGURE 6 is a legend for the color symbols found in FIGURE 5.

FIGURE 7 is a modified schematic view of the process for manufacturing the article; and FIGURE 8 is an enlargement of a section of FIGURE 7.

Synopsis of the invention

We have found that exceptionally attractive designs may be produced on polished or extremely smooth surfaces of plastic material, particularly flexible plastic materials, by rubbing a very small amount of a very fine pigment such as carbon black thereon and then applying a transparent film of varying thickness. The amount of pigment is so slight that adhesion of the transparent film is as good as though there were no pigment applied between the transparent film and the polished base. The end product is a laminated plastic having an aesthetically pleasing iridescent finish of durable construction.

Proposed theories

One theory for the iridescent effect is that a portion of a light wave falling upon the top surface, which it is to be remembered is of varying thickness, is reflected, and another portion of the light wave in penetrating the top surface is refracted by this medium and reflected by the base material. It follows that the waves and their various color components which penetrate the top surface travel a farther distance than the light waves and their color components reflected from the top surface. The light rays penetrating the top surface and reflected from the base material will consequently be somewhat behind, in relation to phase, to those light waves reflected from the top surface alone. Due to the varying paths by which the different color components of the light travel, the hues of color are systematically arranged in order of their wave lengths to give a spectral effect.

Superficially, this theory appears to explain the iridescent phenomenon, yet attempts to produce the Aurora or iridescent effect with the subsequently described base material and top coat alone, without the aid of an intermediate pigment, have not met with any success. As an extension of the above theory it is believed that the pigment plays the role of changing the index of refraction of the base material, and also acts in the role of altering the absorption coefficient of the base material. It is believed that by rubbing pigment on the base material some of the pigment is absorbed which thereby alters the index of refraction of the base material. Thus, at the interface between the base material and the top coat there is created a relatively large difference in the index of refraction. This causes a relatively large reflection at the interface, thereby making possible the interface pattern of iridescence.

As a corollary to this last theory it is believed that the pigment when rubbed on the surface is absorbed into the base material and thereby increases the opacity of the base material in the vicinity of the interface. Thus the light scattered by the pigment is confined to a plane surface corresponding to the interface and hence produces the interference pattern. But, it is to be remembered that this theory and the remainder are presented only as plausible explanations of the iridescent phenomenon and are considered only as possible interpretations of the reasons for the effect.

Another possible theory is that the particles embedded in the surface of the base material form random, semi-opaque, reflective cloud areas. Thereupon, light penetrating the top coat of the laminate encounters the reflective cloud areas at varying depths, and is reflected from these points of unequal depth within the laminate and emerges to give a spectral effect at the surface of the top coat.

Also, since carbon black has produced the most significant effects, light striking the pigment particle could well produce the iridescent effect if oil were occluded on the surface of the pigment particle. Naturally, this theory is based on the assumption that oil is occluded either in or on the particle itself.

Moreover, it is believed that rubbing the polished surface with carbon black apparently forms lines or portions of closely spaced uniform lines of low reflectivity on the smooth, polished surface of the plastic so that a grating is formed which acts just as does an optical grating with definitely and regularly spaced lines.

Perhaps the best explanation of the phenomenon is that it is a combination of all of the theories presented and not due solely to any one. The vagaries of the phenomenon are most easily suited to this explanation. The fact that the top surface must be present supports the light interference theory. The fact that pigment particles must be present supports the theories relating to changes in the index of refraction and absorption coefficient. The fact that the pigmented base must be buffed supports the diffraction grating theory. The fact that pigments other than carbon black will operate to produce somewhat the same result supports the reflective, cloud area theory. Then, too, the fact that the effect is similar to that produced by oil on water supports the view that oil may be present. The conclusion is that each theory possible contributes its share and the effect is a combination of all the above theories.

Description of the figures of the drawings

Referring now more particularly to FIGURES 1–4 of the drawings, wherein like parts are designated throughout the several views by like numerals of reference, the fabric 10 is withdrawn from the fabric roller 11 and is spray coated (although it could be knife or roller coated) with a pore sealing adhesive 12 from a nozzle 13 connected to a source not shown. The fabric with the adhesive coating 14 is passed between rolls 15 and 16. Vinyl plastic material 17, which is preferably a plasticized polyvinyl chloride composition, and banked between the rollers 18 and 19, is applied to the fabric to form a coating 20 thereon, and is polished by the highly polished roll 21 and rubber roll 22 which give the coated fabric a smooth finish before passing between cooling rolls 24 and 25. At this point the vinyl coated fabric has a glossy finish of high luster and is ready to be dusted with a finely-divided pigment 26 by the duster 27. The distribution of the pigment may be done by any conventional means, as by hand or with a mechanical duster. The application of the pigment should be extremely slight. The pigment is sparingly cast upon the surface of the base material so that each square centimeter of surface area has some quantity of pigment, however remote. But it is not necessary that there be as much pigment as a solid layer in which the particles are in contact with one another since the pigment particles will subsequently be redistributed by a buffing operation. The economics of the circumstances as well as the characteristics of the product desired will weigh most heavily in dictating the amount of pigment to be dispersed. After the dusting operation, the dusted article 28 is passed in contact with a buffer or polisher 29, where the pigment particles are moved about or rubbed against the surface of the highly polished plastic base material. By this action some of the pigment will naturally be removed; however, the loss is so slight that it does not detract from the invention.

The article is then passed between rollers 31 and 32 where the top coat of varying depth is applied. Roller 31 has a wire mesh surface 40 to pick up a solution of the top coat resin. Roller 32 is preferably covered with a fabric 33 having thickened portions of suitable design, wound around a rubber roller.

Figure 1:
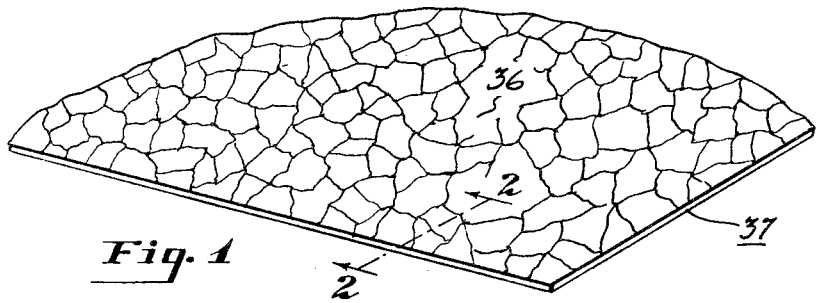
Figure 2:
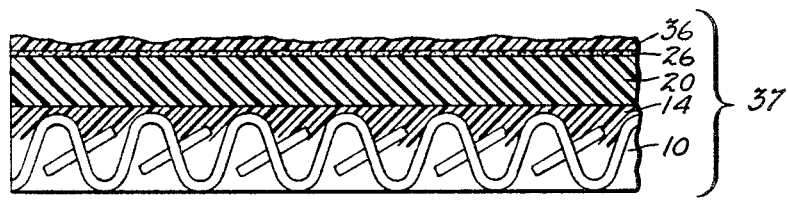
Figure 3:
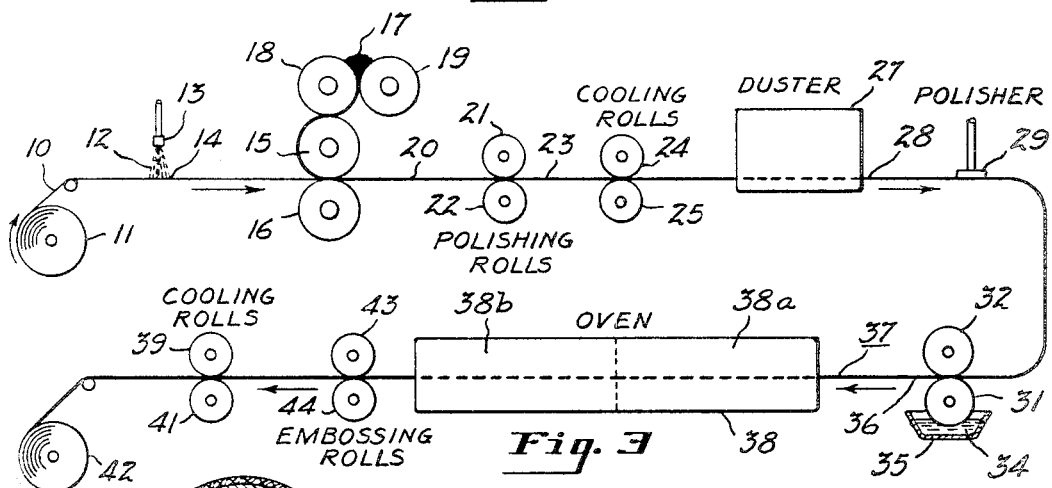
Figure 4:
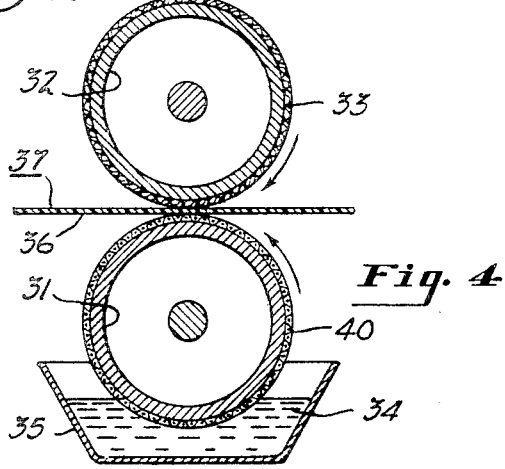

A top coat solution, 34 found in the pan 35 beneath the roller 31, is thereupon applied under pressure between the rollers 31 and 32. The top coat 36 from the solution becomes a part of the laminated article 37 and is dried upon passage through the dryer 38 having two stages 38a and 39b.

Referring particularly to FIGURE 7 and 8 which illustrate a modified form of the apparatus to eliminate the inversion of the laminate, the top coat material is disposed in a trough formed betwen a doctor knife 43 and the roller 31. A thin layer of the top coat solution is picked up by the surface of the gravure roller 31 and carried from the mentioned trough along the roll to the uppermost surface of the laminate where it is deposited before passage between the roller 31 and the rubber roller 32. Upon passage between the rollers 31 and 32 the top coating material becomes of nonuniform thickness on the laminated article 37.

The applied top coat, therefore, by a reverse image process has a surface of varying thickness. The top coat thus formed has a complete coverage of elevations and depressions not discernable to the naked eye. The laminate is cooled by means of rollers 39 and 41 before being wound upon a roller 42. If desired, the hot fabric may be passed between embossing rolls 43 and 44 to provide the laminate with an embossed surface before cooling between rollers 39 and 41.

The temperatures of the heating and cooling apparatus may be variable; however, we have found it desirable to use temperatures in the vicinity of 50° F. for the rolls 21, 22, 24 and 25; for the two stage drying chamber 38, temperatures from 250–300° F. for the first stage (38a) and 400–500° F. for the second stage (38b); and for the cooling rolls 39 and 41, a temperature of 50° F. is desirable.

The fabric

The backing to be used in the laminate is a woven or non-woven fabric, such as canvas, twill, sateen, or might even be a material such as paper. Or the material may be cotton, nylon, rayon, polyester, or mixtures thereof. Its purpose is solely for reinforcing purposes and thus may be eliminated if desired.

The adhesive

The adhesive is applied for the dual purpose of promoting adhesion between the fabric and the top coat, and also, to prevent impregnation into the fabric by the next layer of material. The adhesive may be any desirable material as that produced from a natural or synthetic rubber or plastic in a suitable solvent.

The base material

The plastic base material may be any flexible plastic material that can be produced with a highly polished surface and to which a transparent film may thereafter be adhered. After passing the plastic coated laminate between the polishing rolls 21 and 22 and the cooling rolls 24 and 25, the surface of the plastic coating has a smooth high luster finish. Materials for use in the plastic base material include plasticized polyvinyl chloride compositions including copolymers of vinyl chloride and vinyl acetate, polyvinyl ethers, polyvinyl butyrate, polyethylene, polypropylene, polymers and copolymers of acrylates and methacrylates, ethyl cellulose and other cellulose derivatives and the like. Polyvinyl chloride compositions are, however, superior and are preferred. The base layer may be applied by a conventional means but it is usually applied by calendering as shown in the drawings. It is imperative that this layer have a glossy, high luster, smooth finish in order to achieve the optimum results. Vinyl resins to which have been added a black pigment such as carbon black are preferred for the base material. Plasticizers, anti-degradents, stabilizers, other pigments of various colors, and other various additives may be added as needed.

The pigments

To this layer is applied a light layer of finely-divided, high-quality pigment. The amount of pigment is sufficient to completely cover the glossy surface, yet of such slight amount that blocking, marring, color, viscosity and adhesion are not adversely affected. The size of the particles of the pigment is also exceptionally important if the iridescent effects are to be pronounced. Non-reflective pigment with a particle size greater than 50 square meters per gram and preferably at least 100 square meters per gram are preferred. The pigments that have proved satisfactory are carbon black (Superba), aluminum powder, fine red pigments including Pyrazolone Red X–2500 (made by Imperial Color & Chemical Department of Hercules Powder Company), Monastral Blue or Green (phthalocyanine pigments made by Du Pont) and 7100 aluminum powder. The above pigments have supplied some of the desired results while at the same time permitting adhesion between the top coat and the base.

The top coat

The important feature of the top coat is that it be of varying thickness. As mentioned earlier, the elevations and depressions of the surface play a definite role as one factor contributing toward the phenomenon. The surface coat has been found to have an average thickness from 0.100 to 0.175 micron. Thicknesses outside this range have not provided the iridescent color result. The top coat may be tinted but is preferably colorless.

A polyvinyl butyral solution has produced a wear-resistant top surface that is preferred, when used with carbon black. Other such surfaces which may be used are acrylic resins. Such acrylic resins include polymethyl methacrylate, copolymers of methyl methacrylate and ethylacrylate, and terpolymers of methyl methacrylate, methylacrylate and a small amount of acrylic acid and the like.

It is important to use a top coat containing solvents that do not "grab" or "bite" into (tend to solubilize) the base layer. If a solvent which dissolves a portion of the base layer is used, the solvent will mar the vinyl base layer and the desired iridescent effect disappears. Butyl acetate is the preferred solvent.

In order to achieve the necessary effect, a top coat solution of 2.5 percent to 3.5 percent solids of resin have been applied to the top coat.

As a test of the adhesive qualities of the top coat, "Scotch" tape may be applied to the surface and stripped from the surface. On every test of the top coats herein described there was no top coat removal.

The gravure roller

As shown in the drawings the unfinished laminate is passed between the rollers 31 and 32 so as to receive a top coat.

Roll 32 is designed or covered so as to have a soft, spongy surface. A rubber roller will answer this requirement, but it has also been shown that a cloth covered roller has provided that degree of pliability so as to impose by a reverse image process, a design as well as the requisite non-uniform surface. The unfinished laminate in passing through the subject rollers is coated on one surface with the top coat solution and the opposite surface, the fabric side, is contacted with the soft-surfaced roller 32. The amount of pressure applied to the laminate as it passes between the rollers provides that degree of compression so that the top coat is imparted at least to some extent with the design of the top roller 32, and what is more important, a top coat of varying thickness is produced. Other means of achieving the non-uniform thickness have not proved satisfactory because of the delicate and subtle variations required in the top surface.

The coated surface may thereafter be embossed or shaped to give varied surface patterns without spoiling the iridescent effect.

Figure 5:
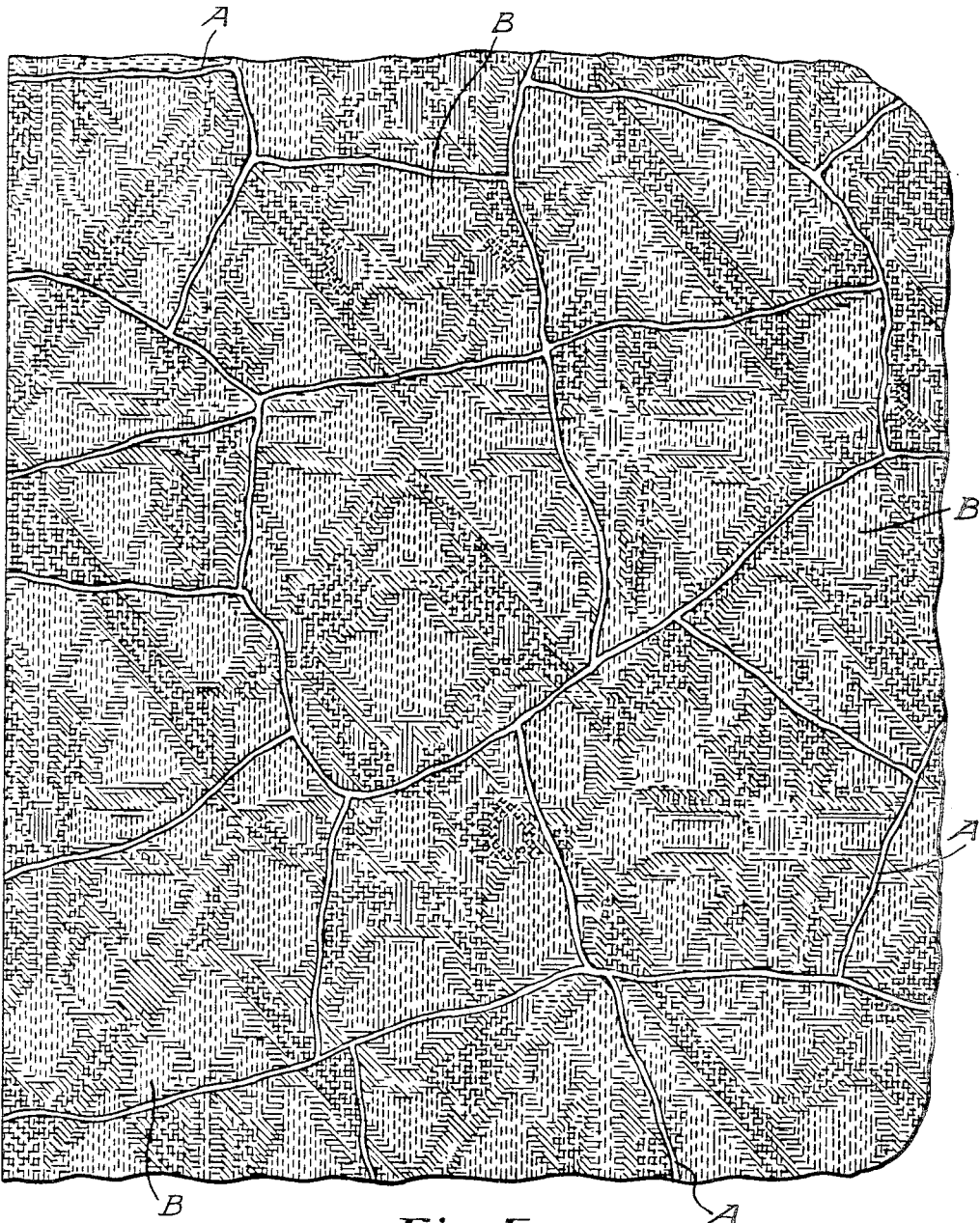

FIGURE 5 illustrates one embodiment of the multiple color effect produced by the above described invention. The overall pattern A is embossed onto the surface of the laminate by rolls 43 and 44 and may be readily altered by changing the design on the embossing rolls. The iridescent pattern B, shown to be somewhat diamond in shape, is imparted to the surface of the laminate by the fabric 33 of roll 32 and may be altered by modifying the surface of the roll 32.

Figure 6:
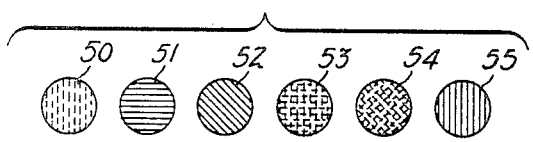

Within the pattern B, as illustrated by the color symbols 50–55 (FIGURE 6) which are the color symbols suggested by the Patent Office, are represented all the colors of a spectrum. The numeral 50 represents violet or purple; the numeral 51 represents blue; the numeral 52 represents green; the numeral 53 represents yellow or gold; the numeral 54 represents orange; and the numeral 55 represents red or pink. The six symbolized colors blend into one another so that every possible wavelength of color is represented and the result is an aesthetically pleasing, iridescent finish possessing all the colors and blends of colors found in a rainbow.

The following example in which parts are by weight illustrates the base material composition.

EXAMPLE I

|  | Pts. |
|---|---|
| Polyvinyl chloride resin | 100 |
| Dioctylphthalate | 42 |
| Stabilizer, e.g., organic phosphate, barium cadmium soaps, etc. | 2 |
| Black pigment (carbon black) | 3.5 |

The above composition was mixed and calendered. When applied to the fabric as aforementioned it produced a smooth, glossy, black layer.

The following example in which parts are by weight illustrates the top coat composition. It is best suited to carbon black both in the base material and as the pigment dusted on the base material.

EXAMPLE II

|  | Pts. |
|---|---|
| 10% solution of polyvinyl butyral in methyl alcohol | 25 |
| Trimethyl urea crosslinker (H–200V, Rohm and Haas) | 1 |
| Methyl alcohol | 63 |
| Butyl alcohol | 11 |

The above ingredients when mixed resulted in a clear solution of 2.5% solids.

The following example in which parts are by weight illustrates the top coat when used with a non-black pigment either in the base material or dusted on the base material. When such non-black pigment is used, the top coat must be modified as shown below in order to get the proper adhesion.

EXAMPLE III

|  | Pts. |
|---|---|
| Methyl methacrylate resin (Lucite 2013) | 10 |
| QYSJ (Union Carbide) polyvinyl chloride | 3 |
| Cellulose acetate butyrate | 1 |
| Methylethyl ketone | 60 |
| Toluene | 26 |
| Butyl acetate | 366 |

What we claim is:

1. The method of producing an iridescent finish on a dark-colored surface of a plastic base material, said surface of said material having a smooth, high luster, glossy finish, which comprises rubbing said surface with a fine pigment and adhering to said surface a transparent film of a plastic coating material, said film having an irregular average thickness of from 0.100 to 0.175 micron.

2. The method of claim 1 wherein prior to rubbing said surface with said pigment said pigment is evenly distributed over said surface in an amount no more than sufficient to cover said surface.

3. The method of claim 1 wherein said pigment is a non-reflective pigment having surface area of more than 50 square meters per gram.

4. The method of claim 1 wherein said pigment is selected from the group consisting of carbon black, fine red pigments, phthalocyanine pigments and aluminum powder.

5. The method of claim 1 wherein said plastic base material is selected from the group consisting of polyvinyl resin compositions, acrylate and methacrylate polymers and copolymers, and cellulose derivatives.

6. The method of claim 1 wherein said plastic coating material is applied to said surface of said plastic base material in solution in an organic solvent which is not a solvent for said plastic base material, and the solvent is removed thereby precipitating said plastic coating material as a film on said surface.

7. The method of claim 6 wherein said plastic coating material is selected from the group consisting of polyvinyl butyral and acrylate and methacrylate resins.

8. The method of producing an iridescent vinyl laminate which comprises sealing a suitable fabric against penetration under calendering pressure, applying a layer of dark polyvinyl chloride composition plasticized to the flexible state, polishing said layer to provide a high luster finish, rubbing carbon black having a surface area of more than 100 square meters per gram on said glossy surface, said carbon black being employed in an amount no more than sufficient to cover said surface, superimposing thereon a transparent liquid coating, said coating being irregular in depth and having an average thickness of from 0.100 to 0.175 micron, drying the said coating and subjecting said laminate to a suitable temperature to cause said film to become firmly attached to said layer of polyvinyl chloride composition.

9. The method of producing an iridescent vinyl laminate which comprises applying to a suitable fabric an adhesive layer to seal and adhere to the fabric so as to prevent easy penetration by hot plastic matter, superimposing on said dried adhesive layer a layer of hot polyvinyl chloride compound comprising 100 parts by weight of polyvinyl chloride resin, 42 parts by weight of a plasticizer, 2 parts by weight stabilizer, and 3½ parts by weight carbon black, contacting said layer with a highly polished surface under pressure to provide a glossy surface, dusting on said glossy surface a layer of a carbon black having a surface area of more than 100 square meters per gram, said carbon black being employed in an amount no more than sufficient to cover said surface, polishing the dusted surface, superimposing thereon a transparent film solution of 2.5% solids comprising 25 parts of a 10% solution of polyvinyl butyral in methyl alcohol, 1 part of trimethyl urea, 63 parts of methyl alcohol, 11 parts of butyl alcohol, said film being irregular in depth and having an average thickness of from 0.100 to 0.175 micron, drying the said laminate and heating surface portions thereof at temperatures of from 250° F. to 500° F.

10. A laminate comprising a plastic base material having a dark-colored glossy surface which has been rubbed with a fine pigment and, adhered to said surface, a transparent plastic coating material having an irregular average thickness of from 0.100 to 0.175 micron.

11. The laminate of claim 10 wherein said plastic base material is selected from the group consisting of polyvinyl resin compositions, acrylate and methacrylate polymers and copolymers, and cellulose derivatives.

12. The laminate of claim 10 wherein said transparent plastic coating material is selected from the group consisting of polyvinyl butyral and acrylate and methacrylate resins.

13. In a flexible, iridescent plastic laminate comprising a plastic base material having at least one dark-colored glossy surface to which is adhered a transparent plastic coating, irregular in thickness and having an average thickness of from 0.100 to 0.175 micron, the improvement wherein said glossy surface has been treated by rubbing with a fine pigment.

14. A laminate comprising a fibrous backing material, an adhesive in contact with said fibrous backing material, a plastic base material having at least one surface in contact with said adhesive and adhered to said fibrous backing material thereby, at least one other surface of said plastic base material being a dark-colored glossy surface which has been rubbed with a fine pigment, and a transparent plastic coating adhered to said glossy surface, said coating being irregular in the thickness and having an average thickness of from 0.100 to 0.175 micron.

References Cited

UNITED STATES PATENTS

| | | |
|---|---|---|
| 2,070,600 | 2/1937 | Jenett. |
| 2,612,456 | 9/1952 | Thacker et al. _____ 117—41 |
| 2,712,190 | 7/1955 | Sobel _____ 161—34 X |
| 2,922,724 | 1/1960 | Greenstein _____ 117—159 X |
| 3,125,484 | 3/1964 | Weiss _____ 117—82 |
| 3,235,399 | 2/1966 | Martin _____ 117—76 |
| 3,244,544 | 4/1966 | Scharf _____ 117—159 |

FOREIGN PATENTS

| | | |
|---|---|---|
| 237,776 | 6/1924 | Germany. |
| 267,370 | 11/1913 | Germany. |

ROBERT F. BURNETT, *Primary Examiner.*

W. A. POWELL, *Assistant Examiner.*